Aug. 1, 1967 H. E. WOTRING 3,333,573
APPARATUS AND METHOD FOR FEEDING POULTRY
Filed July 28, 1965 4 Sheets-Sheet 1

INVENTOR.
HERBERT E. WOTRING
BY Baldwin & Martin
ATTORNEYS

Aug. 1, 1967  H. E. WOTRING  3,333,573
APPARATUS AND METHOD FOR FEEDING POULTRY
Filed July 28, 1965  4 Sheets-Sheet 2

INVENTOR.
HERBERT E. WOTRING
BY *Baldwin & Martin*
ATTORNEYS

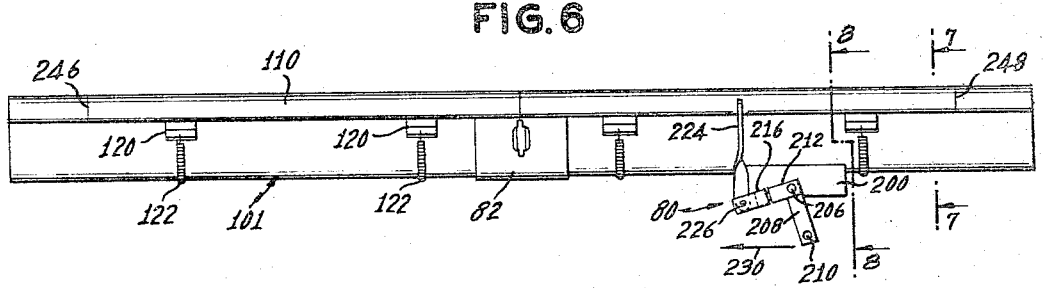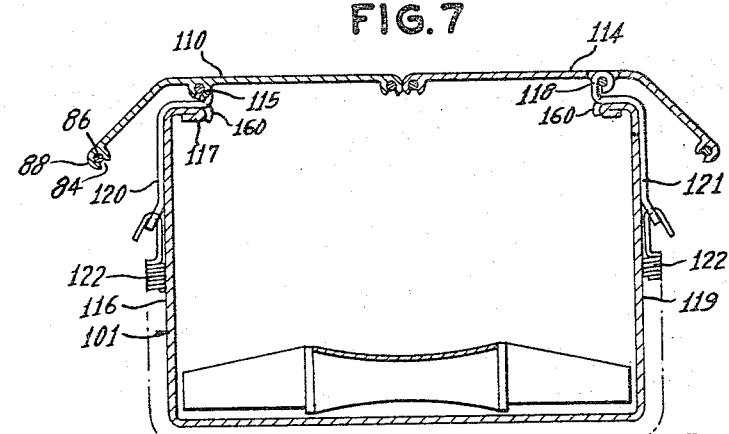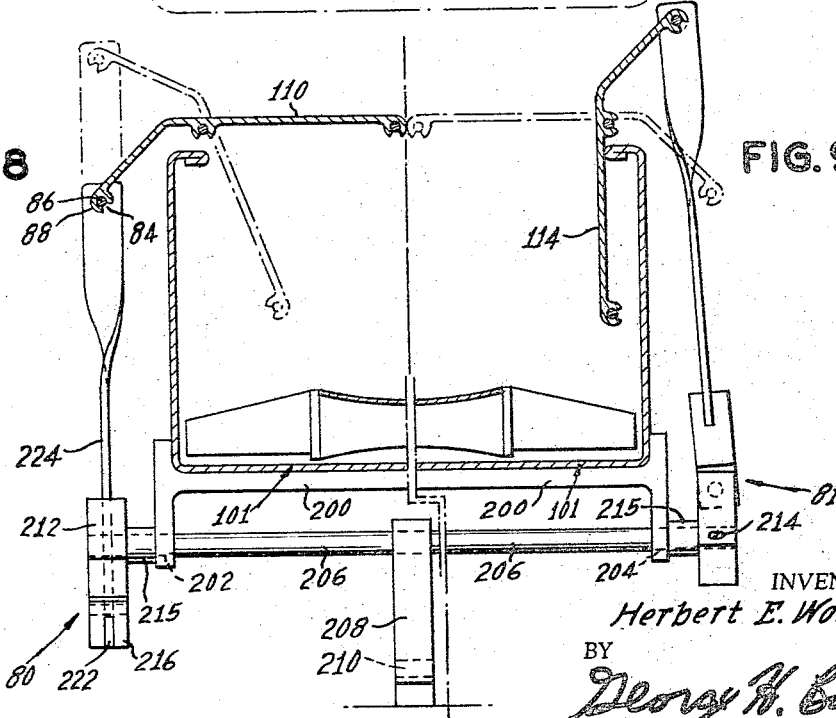

Aug. 1, 1967 H. E. WOTRING 3,333,573
APPARATUS AND METHOD FOR FEEDING POULTRY
Filed July 28, 1965 4 Sheets-Sheet 4
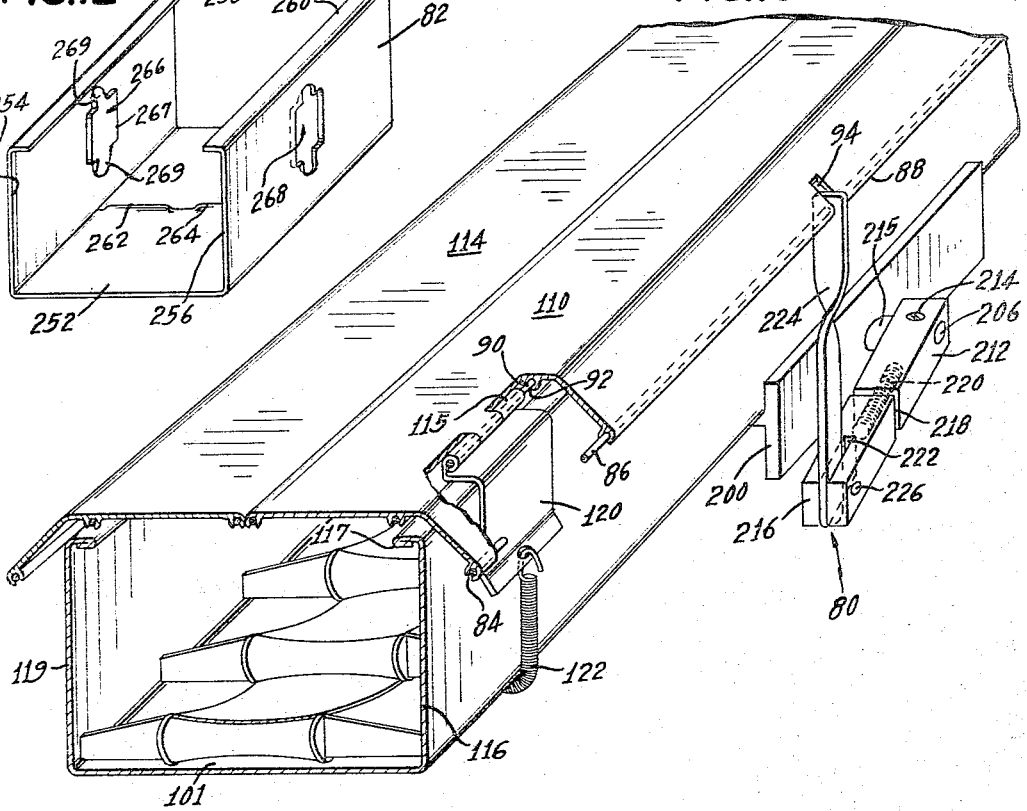
INVENTOR.
Herbert E. Wotring
BY
George H. Baldwin
ATTORNEY United States Patent Office 3,333,573
Patented Aug. 1, 1967

3,333,573
APPARATUS AND METHOD FOR
FEEDING POULTRY
Herbert E. Wotring, P.O. Box 6442,
Jacksonville, Fla. 32205
Filed July 28, 1965, Ser. No. 478,022
19 Claims. (Cl. 119—51)

This application is a continuation-in-part of my copending application S.N. 370,030, filed May 25, 1964, entitled, Apparatus and Method for Feeding Poultry, now abandoned.

This application relates to poultry feeders and particularly to a feeding trough having means to permit and deny access to the feed in the trough simultaneously throughout the feeding portion of the trough, and further relates to methods of feeding poultry.

A general object of the invention is to provide apparatus and methods for mechanized feeding poultry which will minimize starvation of weak birds and injury to the birds during feeding.

Recent years have seen the widespread adoption of mechanized feed troughs for feeding poultry. The system commonly includes an elongated trough extending for a distance in the poultry house equal to at least the length of the house or, if the house is more square than rectangular, equal to as much as several times the length of the house. The trough is provided with a hopper or feed delivery station which deposits feed into one portion of the trough, and a conveyor in the form of a chain, or somewhat less commonly, a screw, which drags or feeds the feed along the trough from the position of the hopper to the other end of the trough, distributing the feed throughout the feeding portion of the trough, the feeding portion being that portion in which the feed is accessible to the birds, and usually comprising substantially the full length of the trough which is within the house.

That part of the feeding portion which is closest to the hopper will, when the conveyor starts to operate, first be provided with feed, and the flock soon learns to cluster at this part. The stronger birds displace the weaker ones at this part frequently injuring weaker birds and preventing the weaker birds from feeding until feed is distributed in relatively smaller amounts along the trough from the delivery end of the feeding portion. The stronger birds, accordingly, have longer to feed than the weaker birds and a more nearly full trough from which to feed.

The conveyor is commonly automatically started and stopped at predetermined times, being regulated by a clock mechanism or by a remote manual switch.

An object of the invention is to provide methods and means for mechanized feeding of poultry with which all birds have a substantially equal chance to feed and with minimum danger of injury to the weaker birds. It is a further object to provide such methods and means adopted for time clock or remoted switch feeding time control.

It is a still further object to provide apparatus readily applicable to existing types of feed troughs and to existing installations thereof.

Other objects of this invention are to provide improved mechanized sections of different lengths wherein the sections may be easily and rigidly connected together in the formation of various lengths of poultry feeding apparatus.

An additional object of this invention is the provision of an improved mechanized poultry feeding section having a hingedly attached cover wherein covers of adjacent sections may be readily and operably connected whereby selective movement of the covers is simultaneous.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 6 is a side elevation of a modification of the system of FIGS. 1–4 showing a section of the trough together with operating means for swinging the trough closure doors;

FIG. 7 is a cross-sectional view partially broken away taken along line 7—7 of FIG. 6 on an enlarged scale;

FIG. 8 is a partial cross-sectional view taken along line 8—8 of FIG. 6 showing the left one-half of the trough and cover in closed position;

FIG. 9 is a partial cross-sectional view taken along line 8—8 of FIG. 6 showing the right one-half of the trough and cover in open position;

FIG. 10 is a detailed perspective view partially in section and partially broken away of a portion of the modified feed trough section of FIG. 6;

FIG. 11 is a perspective view of an inverted portion of one of the trough closure doors; and FIG. 12 is a perspective view of a trough coupler used to joiningly connect sections of the trough together as in FIG. 6.

Figure 1:
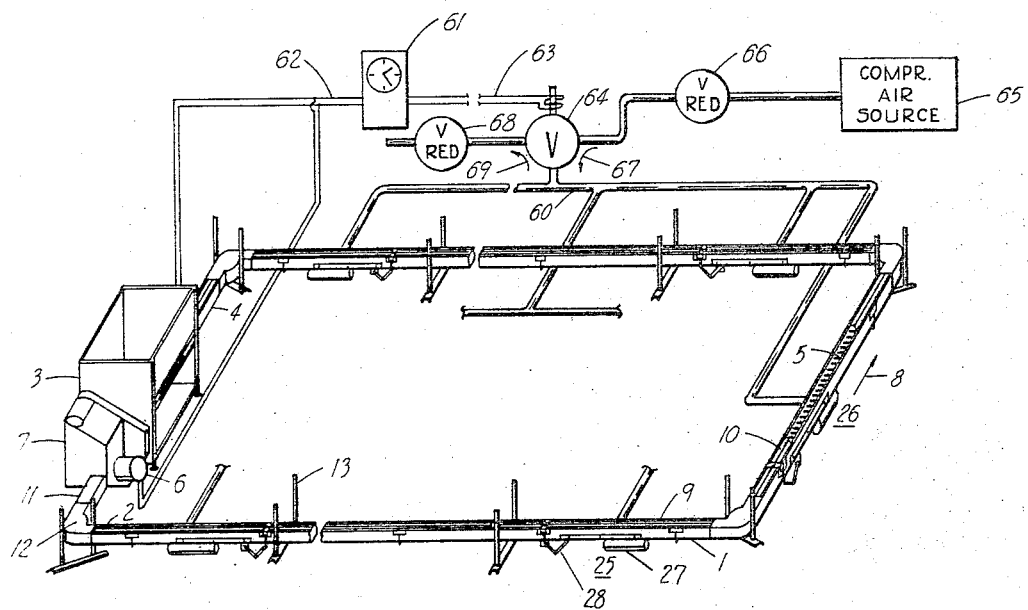
FIG. 1 is a perspective view of a complete poultry feeding system, parts being broken away, and partially in diagram, in accord with the invention.

Turning now to the drawings, the system shown in FIG. 1 includes a metal trough 1 which extends continuously from a delivery portion 2 at or adjacent feed hopper 3, and into which feed is deposited from the hopper, in a complete loop or circuit ending again in a part 4 at the hopper. Conveyor means in the form of a continuous chain 5 is disposed in the trough. Operation of drive motor 6 by means of a cog wheel or capstan in the housing 7, as is well known, drives the conveyor chain to distribute the feed introduced by the hopper along the trough throughout its length. While the chickens or other poultry would tend to congregate at the portion 2 to reach the feed as it comes from the hopper and before the conveyor moving in the direction of arrow 8 has carried feed to more remote parts of the trough, as at 9, according to this invention the trough is closed to access by the birds by means of doors such as door 10 which may be moved into position to cover all parts of the trough which can be reached by the birds and from which the birds can feed. The hopper 3 may be located inside or outside of the poultry house, as desired, but the major portion of the trough will, of course, be within the house. Certain portions of the trough may be permanently covered over as, for example, at the corners and immediately adjacent the hopper and drive housing, as at 11. At each corner, such as corner 12, idler rollers (not shown) may be disposed under cover to direct the chain as is well known. The trough is supported on chains or stanchions 13 several inches above the floor.

Figure 2:
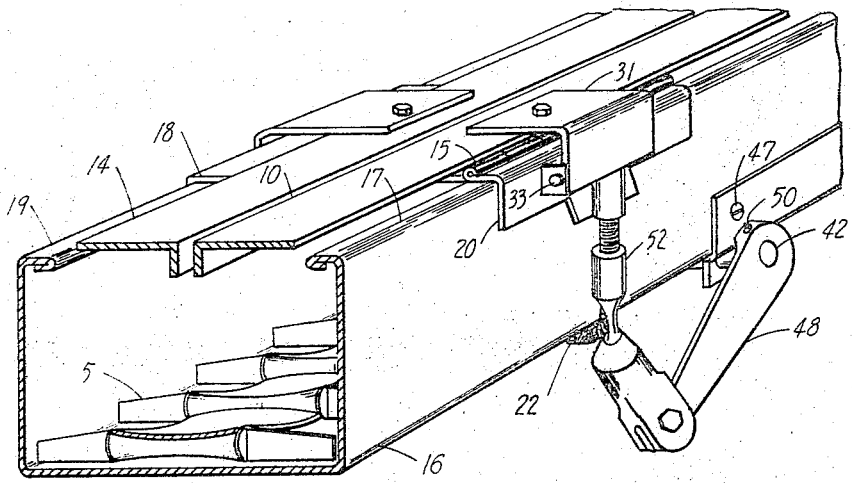
FIG. 2 is a detailed perspective view partially in section of a portion of the feed trough embodied in the system of FIG. 1 on an enlarged scale.

The door means referred to above are best seen in FIG. 2 and, in this embodiment, the means comprise two door elements 10 and 14, element 10 being hingedly attached by means of hinge 15 to the side wall 16 of the trough at the upper edge 17 of the wall. Door element 14 is similarly connected by hinge 18 to side wall 19.

Each door element may be several or many feet long depending upon the rigidity of the door elements, clearances permitted, weight of the poultry, dimensions and other factors. Lengths of about ten feet have proved satisfactory in one installation, for example. Each door may be supported by several hinges, such as hinge 15, arranged along the door. The leaves 20 of hinge 15 and 21 of hinge 18 are held in place and attached to the trough by a tension spring 22 passing under the trough and removably hooked to the leaves at its respective ends. A small tab 60 is struck from leaf 20 to engage inside the trough.

The door elements 10 and 14 are preferably formed of members having a relatively stiff and rigid formation, and, specifically, members including stiffening flanges or webs such as flanges 23 and 24 to permit relatively long door elements with only one operator station for each pair of coextensive door elements.

Figure 3:
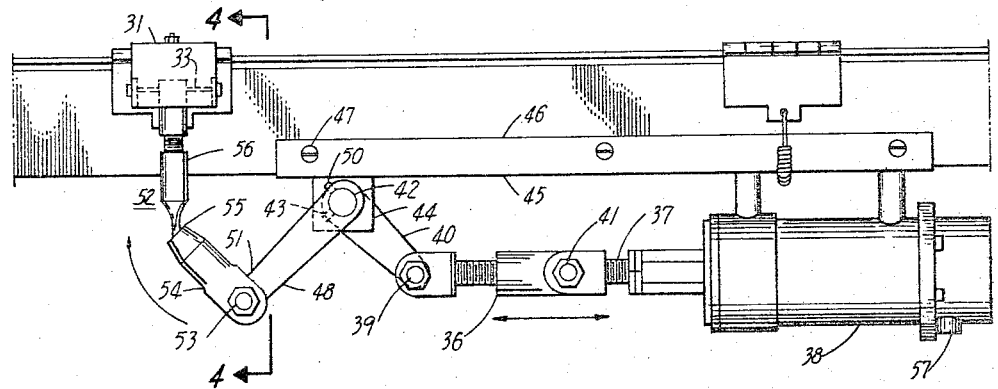
FIG. 3 is a side elevation on an intermediate scale showing a portion of the trough together with operating means for swinging the trough closure doors.

It will be seen from FIGS. 1, 2 and 3 that the trough is provided with a plurality of door operator stations, such as at 25 and 26, each of which includes an operating air cylinder, such as cylinder assembly 27 and door control linkage, such as linkage 28. Operation of the air cylinders causes, through linkage 28, swinging of the doors from normal closed positions shown in solid lines in FIG. 4 to the broken line open positions at 29 and 30.

Figure 4:
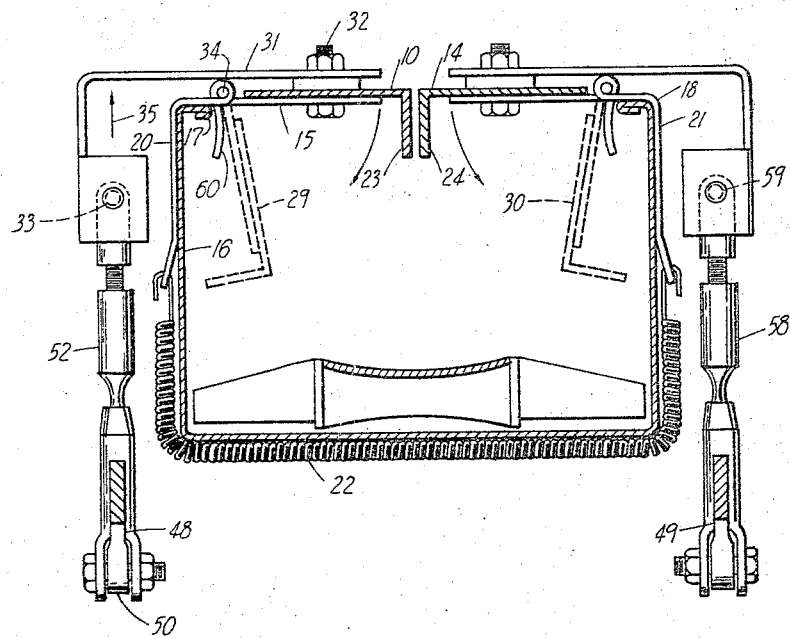
FIG. 4 is a sectional view taken along line 4—4 of FIG. 3 on a still further enlarged scale.

The door operating mechanism is shown in detail in FIGS. 2, 3 and 4. A plate member 31 is bolted by bolt 32 to door 10. The plate includes a connecting pin 33 offset from the axis 34 of hinge 15. The raising of pin 33 in the direction of arrow 35 will, as will be seen in FIG. 4, cause door 10 to pivot or swing about axis 34 into the broken line position 29 to expose the conveyor chain 5 and the feed (not shown) distributed by the conveyor to access. In the construction shown, door 14 moves simultaneously and correspondingly with door 10 into position 30, being operated by interconnected linkage. The linkage of the door operator comprises specifically an articulated adjustable length link 36 connected at one end to piston rod 37 of air cylinder 38 and at its other end through pivot 39 to crank arm 40, these parts being located centrally below trough 1. A knee joint 41 is interposed in link 36 between its ends.

Arm 40 is rigidly affixed to lateral shaft 42 by means of set screw 43 such that shaft 42 rotates in bearing supports 44 through a few degrees as piston rod 37 moves longitudinally. Shaft 42 extends from side to side of the trough and is mounted by two bearing supports 44, one on each side of the center of the trough. These supports and the air cylinder 38 are mounted on a base 45 which includes a flange 46 at each respective side of the trough which is bolted, screwed, or otherwise secured as at 47 to the trough.

Crank arms 48 and 49 are mounted on the respective end portions of shaft 42 adjacent or slightly outwardly of the sides of the trough, each arm being fixed to the shaft by a set screw as at 50. The swinging end 51 of arm 48 is linked to pin 33 of plate 31 by a composite link 52 including a pivot connection 53, link element 54, universal pivot joint 55 and link element 56. Plate 31, being rigidly attached to door 10 is, in actuality, a unitary extension portion of the door which serves to mount or connect pin 33 to the door offset from the hinge axis.

In operation, compressed air is introduced through hose or tube connection 57 into air cylinder 38 forcing piston rod 37 to move out of the cylinder, thereby to swing arm 40 toward vertical position. This movement rotates shaft 42 and, accordingly, swings arms 48 and 49 in a direction to move their swinging ends, such as end 51 of arm 48, upwardly, raising link 52 and pin 33 to move door 10 into open position 29 and raising link 58 and pin 59, which correspond to link 52 and pin 33, at the same time to open door 14. Cylinder 38 may contain a spring tending to retract rod 37, or the links 52 and 58 may be sufficiently heavy to bias the doors toward closed position, effective to swing the doors to closed position when air is exhausted from the air cylinder.

As will be seen in FIG. 1, all of the air cylinders of all of the door operating stations are interconnected by a common manifold air hose, pipe or tube 60 whereby the supply of compressed air to tube 60 causes each cylinder to open the pair of doors linked to the respective cylinder all operating at the same time.

In order to provide automatic operation, a time clock 61 is connected such as by wires 62 to control operation of the hopper and the conveyor drive motor 6, and it is also connected by wires 63 to control a solenoid valve 64. The timer may, for example, be set to supply feed to the conveyor and to operate the conveyor for a few minutes prior to each of the desired feeding times in the day thus to fill the trough from end to end with the desired amount of feed. The timer next operates valve 64 to connect manifold tube 60 to compressed air source 65 through a reducing valve 66. Valve 66 is adjusted to provide a steady smooth operation of the cylinders to open all of the doors in a few seconds and not abruptly as air is supplied in the direction of arrow 67.

The timer is also set to again operate valve 64 after the desired feeding period into the normal valve position in which the manifold tube 60 is disconnected from valve 66 and source 65 and is connected through reducing valve 68 to the atmosphere. The air in the cylinders now slowly exhausts through valve 68 as indicated by arrow 69 thereby to cause the doors gradually to close. The valve 68 is set, for example, to permit air to leak at a rate such that the doors swing from open to closed position in several or many seconds and sufficiently slowly that the poultry has ample time to move away and to avoid being caught between the door as they swing to closed position.

Figure 5:
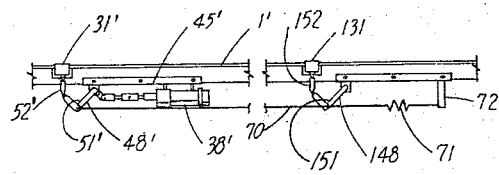
FIG. 5 is a side view on the scale of FIG. 1 showing partially in fragment a modification of the system of FIGS 1–4.

A modified arrangement according to the invention is shown in FIG. 5 wherein cylinder 38', plate 31' and arm 48' correspond to cylinder 38, plate 31 and arm 48 of a typical operating station as described above. These elements are arranged to operate one pair of doors along trough 1'. Instead of repeating all parts of such an operating station for the next pair of doors along the trough, there is provided an arm 148 connected at its swinging end 151 through link 152 to a plate 131 for operating one of the doors at this part of the trough. Arm 148 is mounted like arms 48 and 48' to a shaft and is connected through the shaft to a counterpart at the other side of the trough for operating the other door all as heretofore shown and described for a typical station but with the air cylinder and arm 40 omitted.

The arm 148 is attached at its lower end to a cable 70 which extends to and is attached to the swinging end 51' of arm 48'. A tension spring 71 is also connected to end 151 of arm 148, the spring being anchored on a fixed stud 72 and being arranged to urge arm 148 to swing into position corresponding to closed doors, also tending to maintain cable 70 taut, and additionally biasing arm 48' toward closed door position. In this embodiment, spring 71 may make unnecessary a spring in cylinder 38'.

It is important in the systems herein disclosed that the hinge leaves such as leaf 20 be so held in place on and with respect to the trough side wall that the hinge may adjust itself in position to compensate for sagging of the doors or bending of the trough wall or the like. The specific arrangement shown permits the hinge to move along the edge of the trough wall or to rock or twist slightly, and yet the hinge is held in place by the spring sufficiently to avoid falling off. It will be apparent, also, that by merely unhooking the springs from the hinge leaves, and by disconnecting the linkages such as by removal of pins corresponding to pin 33, the doors may be quickly removed and may be as quickly reinstalled. The whole door system is readily installable in an existing trough type feeding system.

Another modification of the invention is shown in FIG. 6 wherein there is depicted modified trough closure doors or trough covers and mounting means, door operating mechanism, and coupler means for joiningly connecting sections of the feed trough. Tension spring 122, has a construction similar to and serves the same purpose as tension spring 22 of FIGS. 2 and 4; that is, it maintains hinge leaves 120 and 121 in place attached to trough 101. These hinge leaves 120 and 121 although of slightly different construction than hinge leaves 20 and 21 of FIG. 4 function in the same manner. The modified trough closure doors of this embodiment indicated at 110 and 114 provide closure means for the trough as to door elements 10 and 14 of FIG. 2. The modified trough door operating mechanism is depicted at 80 and will be more fully described hereinafter in connection with FIGS. 8, 9 and 10. A new trough coupler or connector 82 is provided, which is capable of joining together two sections of the feed trough such that a strong and rigid joint is formed therebetween.

FIG. 7 details the connection of hinge 115 to the upper edge 117 of feed trough 101. A tab 160 is struck from hinge leaf 120 to hook and engage inside the upper edge of the trough. Hinge leaf 120 is placed on side wall 116, and then attached and secured in place by hooking tab 160 and tension spring 122, releaseably hooked to the lower end of the leaf and passing under the trough to attach to the other hinge leaf. Hinge 118 is similarly connected to the upper edge of side wall 119 of the feed trough.

The modified trough door or cover arrangement is then attached to the trough; door 110 being secured to hinge 115 while door 114 is connected to hinge 118. The attachment is provided by means of a groove or channel and rod construction built into the trough door. Each door is provided with a series of grooves or slots and rods which are slideable therethrough. One such groove or slot 84 with rod 86 contained therein is depicted on the outer edge 88 of cover member 110. In the area adjacent the hinge, the built-up groove portion of the cover is removed to provide room for the hinge pin opening or eye, such that the opening may be aligned in the groove with the rod of the groove, as is more clearly seen in FIG. 7 at hinge 118 where door 114 is attached. When the hinge eye or pin opening is aligned with the rod within the groove, the rod is slipped through the hinge pin opening, thereby securing the cover to the hinge pin and trough. To prevent the rod from lateral movement within the groove it may be desired to crimp the groove about the rod after the rod is in place.

FIG. 8 shows the left-hand side of the feed trough with door 110 in the closed position, a portion of the door operating mechanism 80 and its attachment to the door at outer edge 88. Door operating mechanism 80 is attached to trough cover 110 in a manner similar to that employed in attaching the trough cover to the hinge, i.e., by the use of groove or slot 84 and rod 86 extending therethrough. The attachment is made by boring a hole through the outer end of operating mechanism 80 and removing a small portion of trough door 110 transverse to its outer edge 88 such that the hole in the operating mechanism may be made to align with groove 84. When this hole is aligned with groove 84, rod 86 is pushed into place extending through the hole to secure the operating mechanism to the trough door.

FIG. 9 is similar to FIG. 8, except that the right-hand side of trough 101 is depicted with trough cover 114 in the open position. The cover 114 has been rotated about hinge 118 (FIG. 7) by operating door mechanism 81 (similar to mechanism 80). The attachment at the outer edge of the trough cover 114 to the upper end of opening mechanism 81 is like that at 88 of cover portion 110.

The attachment of cover section 110 to hinge 115 by the use of the rod and groove construction of the cover is more clearly depicted in FIG. 10; wherein portions are broken away, as well as is the connection of the door operating mechanism 80 to cover portion 110 at its outer edge 88. Once hinge 115 and hinge plate 120 is secured in place, by hooking tab 160 over the edge 117 of trough side 116 and hooking tension spring 122 through the opening in the end of plate 120, the door 110 may be attached. The attachment being attained by pushing rod 90 contained within groove 92 through the eyes or pin openings of hinge 115, after cover 110 has been positioned to align the eyes of hinge 115 with cut-outs provided therefor within groove 92. After rod or pin 90 is in place, extending through portions of groove 92 of cover section 110 and through the eyes or openings of hinge 115, it may be secured by crimping of groove 92, if so desired.

Door operating mechanism 80 is attached at its upper end to the outer edge 88 of trough closure door 110. The attachment is made by slotting door 110 as at 94 such that the outer end of mechanism 80 is permitted to extend therethrough. A hole is provided in the outer end of mechanism 80 such that rod 86 within groove 84 may extend through the outer end of the mechanism, thus securing the same to door 110 at its outer edge 88. Attachment of another door operating mechanism 81 to trough closure door 114 is provided for in like manner on the opposite side of the feed trough.

Modified door operating mechanism 80, FIGS. 6, 8, and 10 is attached to the bottom of feed trough 101 by employment of an I-beam member 200. This I-beam is secured to the bottom of the trough by any of a number of suitable means, such as by welding, riveting, bolting, or the like. Extending through bearing holes 202 and 204 in the lower most portion of each side of the I-beam is shaft 206 which is rotatable therein. Secured in the central portion of shaft 206 and rotatable therewith is mechanism operating arm 208. A hole 210 is provided in the lower end of bar 208 for connection of the same to an air motor or cylinder, such as at 39 in FIG. 3. Secured to one end of shaft 206 and rotatable therewith is crank arm 212; the attachment being maintined by set screw 214. In order to maintain arm 212 in a spaced relationship to the side of the trough, spacer washer 215 is employed between the side of the I-beam and the arm.

The swinging end of arm 212 is attached to an arm extension 216 through joint 218 such that this door operating mechanism has more flexibility. This joint 218 is provided by employing a threaded pin 220 which extends across a short gap between arm 212 and arm extension 216 and is screwed a short distance into threaded holes in the adjacent ends of each of these members, such that extension 216 may rotate about pin 220 relative to arm 212. This relative movement may be seen in FIG. 9 wherein trough closure door 114 has been completely opened by door operating mechanism 81. The outer end of arm extension 216 is slotted at 222 to provide for the connection of lever arm 224 by means of pin 226 which extends through arm extension 216 and lever arm 224. Door operating mechanism 81 connected to the other end of shaft 206 is of a like construction.

When mechanism operating arm 208 is moved in the direction of arrow 230 (FIG. 6), as by the air cylinder arrangement 36, 37, 38 and 39 of FIG. 3, shaft 206 will rotate causing arm 212 and arm extension 216 to rotate therewith, whereby lever arm 224 is moved upward. This upward movement of arm 224 will in turn rotate door 110 about hinge 115 opening the trough and exposing the feed therein to the poultry. Trough closure covers 110 and 114 are constructed of relatively light weight material, whereas arm 212 and arm extension 216 are produced from relatively heavy material, such that when the air pressure in air cylinder 38 is released the weight of these arms 212 and 216 and other like members will tend to return the doors 110 and 114 to their closed position. If so desired, a spring may be employed in connection with cylinder 38 to close the doors, or a spring may be used as in FIG. 5 to bias the doors to the closed position.

A portion of trough closure door or cover 114 is shown in an inverted position in FIG. 11 to give a view of the rod and groove structure of this modified closure door. The door 114 is of a one piece construction having two sections; one of which 232 covers the feed trough and prevents entry into the same by the birds, and the other 234 of which joins the first at an obtuse angle. Contained within the door are three channels or slotted grooves 236, 238 and 240 each containing a respective coacting rod 237, 239 and 241. These rods are slidable within the grooves and may be secured therein from a sliding movement by crimping the groove and about the rod at any of a number of places, such as at 242 and 244 on groove 236. This novel groove and rod construction, its use and placement on the door, makes possible not only the connection of sections of the door together as at 246 and 248 of FIG. 6, but also provides for attaching the doors to the trough and connecting the door operating mechanism to the door. Rods such as 237, 239 and 241 need not run the entire length of their corresponding grooves, but only need to be employed in short lengths where the door is connected to the trough, the door operating mechanism is attached to the door, and where sections of doors are joined together.

A new coupler 82 for joining together sections of feed trough as in FIG. 6 is shown in FIG. 12. This connector or coupler is of such dimensions that its bottom 252, sides 254 and 256, and uper edges of the sides or lips 258 and 260 slip over and snugly fit the end of a section of feed trough. In the mid-section of the coupler and extending laterally thereof are two ribs or elongated nipples 262 and 264 which act to strengthen the joint between sections of trough, and further to retain the bottom end portions of a section of feed trough. A section of side 264 is punched-out and bent inward to form to additional member 266; a similar member 268 being formed on side 256. These members, 266 and 268, retain the side end portions of a section of trough; and also strengthen the trough joint formed with the coupler, as the sides of the trough end fit snugly between these members 266 and 268 and the remainder of their respective sides 254 and 256. Each of these members 266 and 268 comprises a tab, such as 267, and a web, as at 269. In use the coupler 82 would be slipped over the end of a section of feed trough, the bottom edge of which would stop at ribs 262 and 264 and the side edges thereof engaging behind inward deformed members 266 and 268. With one section of trough thus in place in the coupler, another section of trough would be inserted in the other end of the coupler being positioned in a manner similar to the first. There is thus formed a strong, rigid and fairly smooth connection, see FIG. 6, between two sections of feed trough.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a poultry feeder for periodic mass feeding of a flock of poultry, an elongated trough, conveyor means within the trough for pre-distribution of feed along said trough from a supply station, said trough having a side wall with an upper edge bounding an elongated top opening through which access to the distributed feed is provided to the poultry, door means for closing said opening thereby to deny such access to the poultry and being movable to open said opening to afford such access to the poultry, means for operating said conveyor means to distribute feed substantially throughout the length of said trough with said door means in closed position, said door means comprising an elongated door member extending along said trough, a hinge means swingably connecting said door member to said elongated upper edge of said trough, said door member being normally disposed in position at least partially closing said opening to interfere with such access and being swingable on said hinge means into a second position inwardly of said trough thereby to permit such access by the poultry simultaneously throughout the length of pre-distribution of feed, and linkage means attached to said door member for selectively swinging said door member on said hinge means from each to the other said position.

2. The combination of claim 1 wherein said means to swing said door member includes timer means correlatively controlling operation of said conveyor means and movement of said door means.

3. In a poultry feeder for periodic mass feeding of a flock of poultry, an elongated trough, a feed hopper for pre-depositing feed into a predetermined portion of said trough, a feed conveyor disposed in and extending along said trough from said portion throughout the feeding portion of said trough operative to pre-distribute feed received at said predetermined portion to said feeding portion, said trough having an access opening and being provided throughout its feeding portion with door means movable from a first position in which the access opening into the trough interior is closed by said door means into a second position in which the access opening is opened to permit access of the birds to the pre-distributed feed, and automatic power means connecting said trough and said door means for selectively moving said door means from said first to said second position at one time throughout said feeding portion whereby access to the feed is afforded simultaneously throughout the length of said feeding portion and for moving said door means from said second position to said first position said power means constituting a means for positioning said door means in said second position remotely from the normal feeding positions of the heads of the poultry.

4. In a poultry feeding system comprising an elongated trough and a feed conveyor in the trough, the trough having a side wall with an upper edge, at least two hinges, each hinge having two leaves, one said leaf comprising a body portion and a tab portion offset from said body portion and connecting with said body portion adjacent the axis of the hinge, said hinges being spaced along said wall and having their respective said one leaves engaged with said side wall with the body portions disposed outwardly of and the tab portions inwardly of the side wall and connecting with said body portions over the upper edge of the side wall, and an elongated door for covering said trough against access to the feed therein supportedly connected to the other leaves of said hinges and swingable on said hinges into position to expose the feed in said trough to access.

5. The combination of claim 4 wherein a respective spring engaged with said body portion of each respective said one hinge leaf and engaged with said trough holds each said one leaf yieldably in position on said side wall.

6. The method of feeding poultry from an elongated trough which comprises the steps of closing the trough against access of the poultry to the interior thereof, distributing feed throughout a length of the interior of the trough sufficient to feed the whole flock without crowding while maintaining the trough so closed against such access of the poultry, and after the feed is distributed throughout such length, opening at one time the whole said length for such access, thereby to prevent crowding near the feed end of the trough, injury of less strong birds, overfeeding of strong birds, and starving of weak birds.

7. A poultry feeder comprising two elongated trough members of predetermined U-shape, said members having bottom walls and upstanding side walls defining inner and outer trough member faces, said side walls being of predetermined thickness, said trough members being adjacently alignedly disposed with one end of one trough member spaced from the adjacent end of the other trough member, a U-shaped coupler member having a bottom wall and upstanding side walls and having opposite ends, said coupler member spanning between said trough member ends and being disposed with its side and bottom walls in engagement with corresponding walls of said trough members along one of said trough member faces of both of said trough members, each of said coupler member side walls being provided with a tab offset from the plane of the respective side wall by a distance substantially equal to said predetermined thickness, and a respective web connecting each said tab to the respective side wall of the coupler member, said web being narrower than said tab and extending between said trough member ends, said tabs spaning between said trough member ends and being in engagement with the other said trough face along the respective trough member side walls adjacent said ends.

8. A poultry feeder comprising two elongated trough members of predetermined U-shape, said members having bottom walls and upstanding side walls defining inner and outer trough member faces, said side walls being of predetermined thickness, said trough members being adjacently alignedly disposed with one end of one trough member spaced from the adjacent end of the other trough member, a U-shaped coupler member having a bottom wall and upstanding side walls and having opposite ends, said coupler member spanning between said trough ends and being disposed with its side and bottom walls in engagement with corresponding walls of said trough members along one of said trough member faces of both of said trough members, one of said coupler member side walls having a tab offset from the plane thereof by a distance substantially equal to said predetermined thickness, and a web connecting said tab to said one side wall of the coupler member, said web being narrower than said tab and extending between said trough member ends, said tab portion spanning between said trough member ends and being in engagement with the other said trough member face along the respective side wall adjacent said ends.

9. A poultry feeder comprising two elongated trough members of predetermined U-shape, said members having bottom walls and upstanding side walls defining inner and outer trough member faces, said side walls being of predetermined thickness, said trough members being adjacently alignedly disposed with one end of one trough member spaced from the adjacent end of the other trough member, a U-shaped coupler member having a bottom wall and upstanding side walls and having opposite ends, said coupler member spanning between said trough member ends and being disposed with its side and bottom walls in engagement with the corresponding walls of said trough members along one of said trough member faces of both of said trough members, each of said coupler member side walls being provided with a tab offset from the plane of the respective side wall by a distance substantially equal to said predetermined thicknes, and a respective web connecting each said tab to the respective side wall of the coupler member, said web extending between said trough member ends, one of said tabs being in engagement with the other of said trough faces along the respective trough member side wall adjacent said end of one of said trough members, the other of said tabs being in engagement with said other of said trough faces along the respective trough member side wall adjacent said end of the other of said trough members.

10. The poultry feeder of claim 7 wherein said coupler member further comprises an elongated rib extending transversely along said bottom wall of said coupler member, said elongated rib being aligned between and having the same width as said webs maintaining a spacing between the ends of the bottom walls equal to the spacing between the ends of the side walls of said trough member.

11. Cover means for an elongated open top poultry feeder trough, said means comprising two elongated members in end to end relationship, said members having portions in covering relation to the open top of said trough, each of said members being provided with at least two longitudinally extending grooves in spaced parallel relationship, a respective, slidable rod in each of said grooves engaged in the extending between aligned corresponding grooves of said two members, said cover members being hingedly connected to the upper edge of the trough, and means connected to one of said members for hingedly swinging both members from said trough covering position into a position opening the trough to access.

12. Cover means for an elongated open top poultry feeder trough, said means comprising two extruded elongated members in end to end relationship, each having two integral side-by-side portions, one of which extends horizontally over said trough when said member is in position closing the open top of said trough, and the other of which extends outwardly beyond the upper edge of the trough side wall, each of said members being provided on its underside with at least two longitudinally extending grooves in spaced parallel relationship, a respective slidable rod in each of said grooves engaged in and extending between aligned corresponding grooves of said two members, said cover members being hingedly connected to the upper edge of the trough, and means connected to said outwardly extending portion of one of said members for hingedly swinging both members from said trough covering position into a position opening the trough to access.

13. A poultry feeder comprising an elongated trough having an open top and upstanding side walls, an elongated cover member provided to cover said open top of said trough, said cover member being provided on its underside with at least two longitudinally extending grooves in spaced parallel relationship, a respective, slidable rod in each of said grooves and cooperative therewith to engage and connect together two elongated cover members in end to end relationship, one of said grooves and its cooperative rod being positioned adjacent the upper edge of one of said side walls of said trough, a hinge leaf having a hinge pin opening connected to said trough, said hinge pin opening positioned adjacent said upper edge of said one side wall to provide attachment for said cover member to said trough, means attaching said hinge leaf to said trough, and said rod contained within said one groove extending through said hinge pin opening of said hinge leaf to attach said cover member to said hinge leaf in a manner to selectively open and close access to the open top of said trough.

14. A poultry feeder comprising an elongated trough, having an open top and upstanding side walls, an elongated cover member provided to cover said open top of said trough, said cover member being provided on its underside with at least two longitudinally extending grooves in spaced parallel relationship, a respective, slidable rod in each of said grooves and cooperative therewith to engage and connect together two elongated cover members in end to end relationship, one of said grooves and its cooperative rod being positioned adjacent the upper edge of one of said side walls of said trough, a hinge leaf having a hinge pin opening connected to said trough, said hinge pin opening position adjacent said upper edge of said one side wall to provide attachment for said cover member to said trough, said hinge leaf having a tab struck from its upper edge and extending downwardly over said upper edge of said one side wall, a spring releasably attached to the lower edge of said hinge leaf and extending around the bottom of said trough to hookingly attach said hinge leaf to said trough, and said rod contained within said one groove extending through said hinge pin opening of said hinge leaf to attach said cover member to said hinge leaf in a manner to selectively open and close access to the open top of said trough.

15. A poultry feeder comprising, an elongated trough having an open top and upstanding side walls, an elongated cover member provided to cover said open top of said trough, said cover member having a first lateral portion extending horizontally over said trough when said cover member is in position covering said open top of said trough, and a second lateral portion integral with and in side-by-side relationship to said first portion and extending outwardly over and beyond the upper edge of one of said trough side walls, said cover member being provided on its underside with at least two longitudinally extending grooves in spaced parallel relationship, a respective slidable rod in each of said grooves and cooperative therewith to engage and connect together two elongated cover members in end to end relationship, one of said grooves and its cooperative rod being positioned adjacent the outer edge of said second lateral portion of said cover member, a member outwardly adjacent a side of the trough, means for selectively moving said member upwardly and downwardly, and said rod contained within said one groove connecting said member to said outer edge of said second lateral portion of said cover member.

16. A poultry feeder comprising an elongated trough having an open top and upstanding side walls, an elongated cover member provided to cover said open top of said trough, said cover member having a first lateral portion extending horizontally over said trough when said cover member is in position covering said open top of said trough, and a second lateral portion integral with and in side-by-side relationship to said first portion and extending outwardly over and beyond the upper edge of one of said trough side walls, said cover member being provided on its underside with at least two longitudinally extending grooves in spaced parallel relationship, a respective slidable rod in each of said grooves and cooperative therewith to engage and connect together two elongated cover members in end to end relationship, one of said grooves and its respective rod being positioned adjacent the upper edge of one of said side walls of said trough, a hinge leaf having a hinge pin opening connected to said trough, said hinge pin opening positioned adjacent said upper edge of said one side wall to provide attachment for said cover member to said trough, said hinge leaf having a tab struck from its upper edge and extending downwardly over said upper edge of said one side wall, a spring releasably attached to the lower edge of said hinge leaf and extending around the bottom of said trough to hookingly attach said hinge leaf to said trough, said rod contained within said one groove extending through said hinge pin opening of said hinge leaf to attach said cover member to said hinge leaf, the other of said grooves and its cooperative rod being positioned adjacent the outer edge of said second lateral portion of said cover member, a member outwardly adjacent a side of the trough, means for selectively moving said member upwardly and downwardly, and said rod contained within said other groove connecting said member to said outer edge of said second lateral portion of said cover member.

17. In a poultry feeder, an elongated trough, conveyor means within the trough for distributing feed along said trough from a supply station, said trough having a side wall with an upper edge bounding an elongated top opening through which access to the distributed feed is provided to the poultry, door means for closing said opening thereby to deny such access to the poultry and being movable to open said opening to afford such access to the poultry, said door means comprising an elongated door member extending along said trough, a hinge means swingably connecting said door member to said upper edge of said trough, said door member being normally disposed in position at least partially closing said opening to interfere with such access and being swingable on said hinge means into a second position away from said opening thereby to permit such access by the poultry, means to swing said door member selectively from each to the other said position, said trough comprising two side walls and said door means comprising two coextensive elongated door members each hinged to the upper edge of a respective said side wall, said door means being operatively connected to said door member swinging means, and said second position of each of said door members being a position inwardly of said side walls.

18. In a poultry feeder, an elongated trough, conveyor means within the trough for distributing feed along said trough from a supply station, said trough having a side wall with an upper edge bounding an elongated top opening through which access to the distributed feed is provided to the poultry, door means for closing said opening thereby to deny such access to the poultry and being movable to open said opening to afford such access to the poultry, said door means comprising an elongated door member extending along said trough, a hinge means swingably connecting said door member to said upper edge of said trough, said door member being normally disposed in position at least partially closing said opening to interfere with such access and being swingable on said hinge means into a second position away from said opening thereby to permit such access by the poultry, means to swing said door member selectively from each to the other said position, said trough comprising two side walls and said door means comprising two coextensive elongated door members each hinged to the upper edge of a respective said side wall and operatively connected to said door member swinging means, each said side wall being provided with a respective additional hingedly mounted door member extending from an end of a respective one of said first mentioned door members and means mechanically coupled to said first door member swinging means operative to swing each of said last mentioned door members.

19. In a poultry feeder, an elongated trough, conveyor means within the trough for distributing feed along said trough from a supply station, said trough having a side wall with an upper edge bounding an elongated top opening through which access to the distributed feed is provided to the poultry, door means for closing said opening thereby to deny such access to the poultry and being movable to open said opening to afford such access to the poultry, said door means comprising an elongated door member extending along said trough, a hinge means swingably connecting said door member to said upper edge of said trough, said door member being normally disposed in position at least partially closing said opening to interfere with such access and being swingable on said hinge means into a second position away from said opening thereby to permit such access by the poultry, means to swing said door member selectively from each to the other said position, said trough comprising two side walls and said door means comprising two coextensive elongated door members each hinged to the upper edge of a respective said side wall and each operatively connected to said door member swinging means, each said side wall being provided with a respective additional hingedly mounted door member extending from an end of a respective one of said first mentioned door members, means mechanically coupled to said first door member swinging means operative to swing each of said last mentioned door members, said door members, said door member swinging means comprising an air cylinder and piston and said mechanical coupling means comprising an elongated member movable in response to movement of said piston in response to actuation of said cylinder.

References Cited

UNITED STATES PATENTS

| | | | |
|---|---|---|---|
| 1,553,746 | 9/1925 | Bulla | 119—63 |
| 2,157,682 | 5/1939 | Sweeny | 119—63 |
| 2,652,808 | 9/1953 | Wagner | 119—52 |
| 2,782,761 | 2/1957 | Martin et al. | 119—52 |
| 2,985,302 | 5/1961 | Brands | 119—52 X |
| 3,137,272 | 6/1964 | Lepper | 119—51.12 |
| 3,181,506 | 5/1965 | Seymour | 119—56 |
| 3,187,720 | 6/1965 | Stoltzfus | 119—63 |
| 3,234,914 | 2/1966 | Wormgoor | 119—63 |
| 3,241,653 | 3/1966 | Van Huis | 198—57 |
| 3,250,250 | 5/1966 | Woock | 119—52 |

SAMUEL KOREN, *Primary Examiner.*

ALDRICH F. MEDBERY, *Examiner.*